Jan. 12, 1932.  A. J. CHRISTOPHER  1,841,088
ELECTRICAL TESTING SYSTEM AND METHOD
Filed Dec. 6, 1927
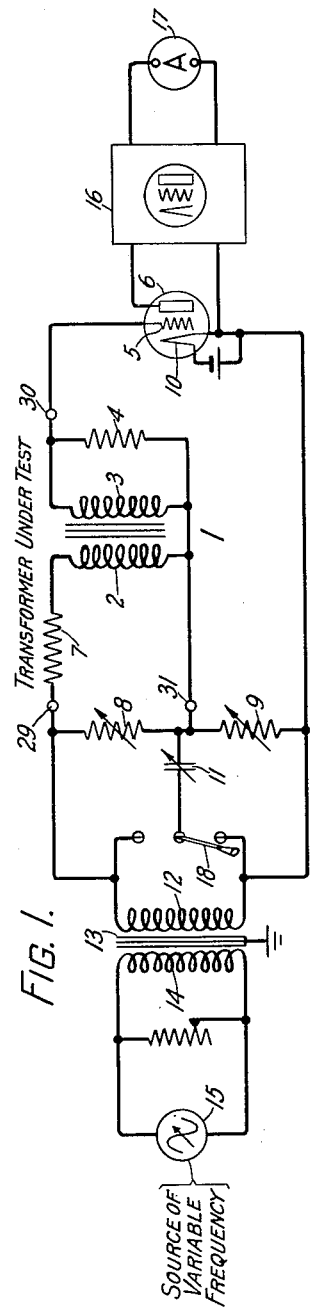
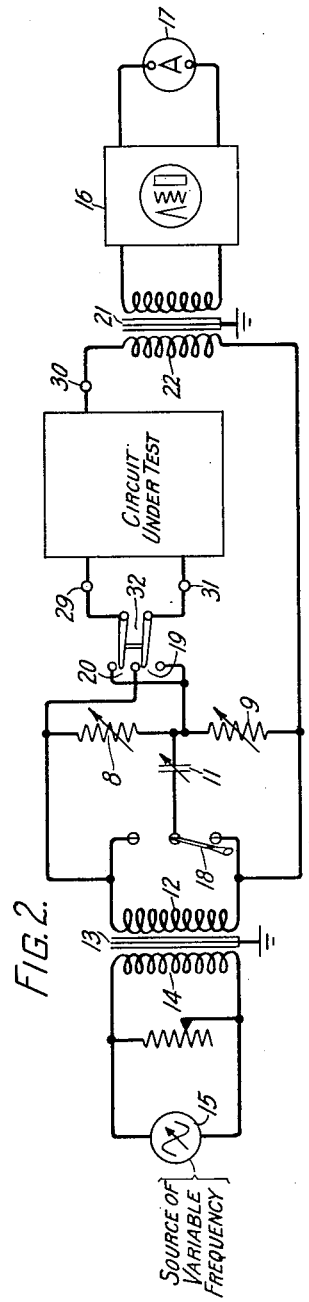
INVENTOR:
ARTHUR J. CHRISTOPHER
BY H. A. Burgess
ATTORNEY Patented Jan. 12, 1932

1,841,088

UNITED STATES PATENT OFFICE

ARTHUR J. CHRISTOPHER, OF YONKERS, NEW YORK, ASSIGNOR TO BELL TELEPHONE LABORATORIES, INCORPORATED, OF NEW YORK, N. Y., A CORPORATION OF NEW YORK

ELECTRICAL TESTING SYSTEM AND METHOD

Application filed December 6, 1927. Serial No. 238,056.

This invention relates to electrical testing or measuring and is particularly applicable to the determination of phase shift.

An object of the invention is to simplify the accurate determination of the phase shift characteristics of electrical circuits and apparatus.

In accordance with the invention a simple and efficient arrangement is provided for measuring phase shift with but a single setting of the balancing circuit.

A feature of the invention is that a null reading of the meter determines that the circuit is balanced.

In the form of the invention described herein circuit connections are employed for balancing the input and output voltages of the circuit or apparatus under test and provision is made for compensating for the phase difference between the two voltages and for the determination of this phase difference. The balancing circuit consists of two variable non-inductive resistances connected in series and a variable condenser arranged so that it can be connected in parallel with either resistance. The input of the circuit or apparatus under test is connected in parallel with one of the variable resistances. For measurements of phase shift between 0° and 90° and between 270° and 360° the output is connected so that if the device to be measured had zero phase shift the voltage across the output would be in opposite direction to that across the input. For measurements of phase shift between 90° and 270° the output is connected so that if the device to be measured had zero phase shift the voltage across the output would be in the same direction as the voltage across the input. An alternating wave is applied across the resistances; the condenser and the resistances are then adjusted until the voltage across the output of the circuit or apparatus under test is equal and opposite to that across the resistance (or resistance and condenser), not in parallel connection with the input circuit, as indicated by zero deflection in the meter. The phase shift is determined from the following equation:

$$\tan^{-1}\frac{R}{X_c} = \text{phase shift angle,}$$

(where R is the resistance connected in parallel with the condenser).

The invention may be more readily understood by reference to the following detailed description in connection with the drawing in which Fig. 1 shows an embodiment of this invention, Fig. 2 shows a modification of the circuit in Fig. 1 and Figs. 3 and 4 show methods which may be used in connecting in the circuit of Fig. 2 different kinds of coils to be tested.

In Fig. 1 a transformer 1 is to be tested. The outer end of the primary winding 2 is connected to the inner end of secondary winding 3, it being assumed that both windings are applied in the same direction. Then the voltage induced across secondary winding 3 will be in an opposite direction to that in primary winding 2, if the transformer has a zero phase shift. An impedance 4 equal to the impedance which the transformer is to work into is connected in parallel with the secondary winding 3 and the outer end of this secondary winding is connected to the grid 5 of a three-element vacuum tube 6. An impedance 7 equal to the impedance from which the transformer is to work is connected between the inner end of the primary winding 7 and one end of a variable resistance 8. The other end of variable resistance 8 is connected to the outer end of primary winding 2, the inner end of secondary winding 3 and one end of variable resistance 9. The other end of variable resistance 9 is connected to the filament 10 of vacuum tube 6. A condenser 11 is arranged so that it can be connected by means of a switch 18 in parallel with either variable resistance 8 or variable resistance 9 or left disconnected. This condenser is used to vary the phase difference between the voltage impressed across resistance 9 and the voltage impressed across winding 2 of the transformer. Obviously, means other than a condenser for varying the phase could be substituted. Across variable resistances 8 and 9, which are connected in series, is connected the secondary winding 12 of transformer 13, the primary 14 of which is connected across the source of variable frequency 15. An amplifier 16 is connected across the output of vacuum tube 6 and an ammeter 17 is connected in the output of the amplifier. Preferably the meter 17 is adjusted so that the needle is at its zero position when the source of variable frequency 15 is disconnected from the apparatus.

If the transformer 1 under test is a step up input transformer which at a particular frequency has a zero phase shift, the test is made as follows: With the condenser 11 disconnected and with the source of variable frequency 15 connected to the circuit variable resistances 8 and 9 are adjusted until the reading on the meter 17 is the same as was obtained with the source of variable frequency 15 disconnected, and the readings of these two resistance values noted. These resistances are to be adjusted so that the value of resistance 8 will be small as compared to that of the transformer under test, preferably not greater than 10 ohms. This is desirable in order to keep the current through the winding 2 as small as possible with respect to the current magnitude through the resistance 8. If the current through the winding 2 is not maintained small with respect to the current through the resistance 8, the reading of the resistance 8 will have to be corrected for the current flow through the winding 2 for each adjustment of the resistance 8 and for the impedance of the winding 2 of the transformer under test. Of course, the lower the value of these resistances the larger will be the capacity 11 required for adjustment when the phase shift produced by the transformer is other than zero. The voltage across variable resistances 8 and 9 is in the same direction as that across primary winding 2 of transformer 1 and since the transformer windings are connected so that the voltage across secondary winding 3 is in the opposite direction to that across primary winding 2, the voltage across the secondary winding 3 is in the opposite direction to that across variable resistance 9. When adjusted so that the reading on meter 17 is the same with the source of variable frequency 15 connected as was obtained with the source of variable frequency disconnected the voltage across variable resistance 9 is equal and opposite to that across the secondary winding 3 and the resultant voltage impressed across the grid and filament of vacuum tube 6 is zero.

If the input transformer under test has a phase shift other than zero, it will be impossible to adjust resistances 8 and 9 so that the reading on meter 17 will be the same with the source of variable frequency 15 connected as was obtained with the source of variable frequency disconnected, for in that case the voltage across variable resistance 9 cannot be made equal in both magnitude and phase to that across secondary winding 3 with condenser 11 disconnected. Condenser 11 in that case is connected by means of switch 18 in parallel with variable resistance 8 or variable resistance 9, depending on whether the phase shift produced by the transformer is positive or negative. If the phase shift is positive and between zero and 90°, variable condenser 11 is connected in parallel with variable resistance 8 and the circuit is balanced by adjusting variable resistances 8 and 9 and condenser 11 until the phase shift introduced by condenser 11 is equal to that produced by the transformer under test and the voltage across resistance 9 equal and opposite to that across secondary winding 3. If the phase shift is negative and between 270° and 360° the circuit is balanced in a similar manner with variable condenser 11 connected in parallel with variable resistance 9.

Having obtained readings for variable resistances 8 and 9 and variable condenser 11 in parallel with variable resistance 8 in the case of positive phase shift between 0° and 90° the phase shift is equal to $$\tan^{-1}\frac{R_8}{X_{11}}.$$

The phase shift for a transformer having a negative shift between 270° and 360° is equal to $$\tan^{-1}\frac{R_9}{X_{11}}.$$

If the phase shift is between 90° and 270° it can be determined by inserting, as shown in Fig. 2, a double pole double throw switch 32 in the circuit, and connecting the switch in position 20. The function of this switch is to reverse the direction of the potential applied to the input circuit of the transformer with respect to that across resistance 9.

It is also possible from the readings obtained to calculate the voltage amplification of the transformer 1. If the transformer has zero phase shift the voltage amplification is $$\frac{R_9}{R_8}.$$

When the transformer has a positive phase shift between 0° and 90°, condenser 11 is connected in parallel with the resistance 8 and the resistances 8 and 9 and condenser 11 are adjusted until the circuit is balanced as indicated by the reading on meter 17. The voltage across variable resistance 9 is $e_9$; and $e_0 = e_3$ (where $e_3$ equals the voltage across winding 3). Also $e_3 = \mu e_{8-11}$ (where $e_{8-11}$ is the voltage across variable resistance 8 and variable condenser 11 and $\mu$ is the amplification of the transformer). Therefore, $e_0 = \mu e_{8-11}$ but $e_{8-11}$ varies as $$\frac{R_8 X_{11}}{R_8 - jX_{11}}$$

and $e_0$ varies as $R_9$. Therefore, $$\frac{R_8 X_{11}}{R_8 - jX_{11}} \mu = R_9$$

and $$\mu = \frac{R_9(R_8 - jX_{11})}{R_8 X_{11}}. \quad \text{Equation (1)}$$

Where the transformer has a negative phase shift between 270° and 360°, variable condenser 11 is connected in parallel with variable resistance 9 and when the resistances and condenser are adjusted so that the circuit is balanced the voltage across variable resistance 9 and variable condenser 11 is $e_{9-11}$ and therefore, $e_{9-11} = e_3$ and also $e_3 = \mu e_8$. Therefore, $e_{9-11} = \mu e_8$, but $e_8$ varies as $R_8$ and $e_{9-11}$ varies as $$\frac{R_9 X_{11}}{R_9 - jX_{11}}.$$

Therefore $$\frac{R_9 X_{11}}{R_9 - jX_{11}} = R_8 \mu$$

and $$\mu = \frac{R_9 X_{11}}{R_8(R_9 - jX_{11})}. \quad \text{Equation (2)}$$

In the case of an output transformer the phase shift is determined in the same manner as for the input transformer.

The transmission efficiency of an output transformer can be determined as follows:—
For an ideal output transformer the resistance looking into winding 2 is equal to $R_7$ which in turn is equal to $$\frac{R_4}{T^2},$$

(where T equals the turns ratio of winding 3 to winding 2). Then if $e$ equals the voltage across $R_8$, $$\frac{e}{2}$$

equals the voltage across winding 2 (since the resistance looking into winding 2 is in series with and is equal to $R_7$). Also $$\frac{e}{2} \times T$$

equals the voltage across winding 3 but the voltage across $R_8$ is proportional to $R_8$. Also the voltage across $R_9$ is proportional to $R_9$ and therefore the voltage across the winding 3 varies as $$\frac{R_8 T}{2} = R_9.$$

For the ideal output transformer $$\frac{2R_9}{R_8 T} = 1$$

and the ratio $$\frac{2R_9}{R_8 T} \times 100$$

may be used in calculating the efficiency of an ordinary transformer in per cent where its phase shift is zero since the losses in the transformer will result in making $$\frac{2R_9}{R_8 T} < 1.$$

Where the transformer has a positive phase shift between 0° and 90°, the impedance of condenser 11 which is placed across resistance 8 to obtain balance must be taken into consideration. The transmission efficiency in this case in per cent is equal to $$\frac{2R_9(R_8 - jX_{11})}{R_8 X_{11} T} \times 100. \quad \text{Equation (3)}$$

Where the transformer has a negative phase shift (between 270° and 360°) from similar calculations the transmission efficiency in per cent is $$\frac{2R_9 X_{11}}{R_8 T(R_9 - jX_{11})} \times 100. \quad \text{Equation (4)}$$

Fig. 2 shows a modification of the circuit shown in Fig. 1, the circuit under test being connected to terminals 29, 30 and 31. A double throw double pole switch 32 is shown for reversing the input connections of the circuit under test across resistance 8. If an input transformer and impedances as shown in Fig. 1 are connected in the circuit of Fig. 2, when the switch 32 is in position 19 the transformer 1 and variable resistance 8 are connected as shown in Fig. 1. When the switch 32 is in position 20, the transformer 1 and variable resistance 8 are connected so that the voltage across variable resistance 8 is in the opposite direction to the voltage across winding 2.

With this arrangement the measurement of the phase shift can be made in circuits other than transformers where the voltage across the input side is not in opposite direction to that across the output side, as is the case of a transformer connected as in Fig. 1. Where the phase shift of such a circuit is between 0° and 90° or between 270° and 360° the measurements can be made with switch 32 in position 20 and where the phase shift of a circuit is between 90° and 270° it can be measured with switch 32 in position 19.

In Fig. 2 a transformer 21 is provided with its primary winding 22 connected in the circuit where the grid 5 and filament 10 of vacuum tube 6 are connected in Fig. 1. This arrangement increases the sensitivity of the circuit by permitting the use of a step up transformer.

Fig. 3 shows a method of connecting a transformer 25 in Fig. 2 when the transformer is to be used in a circuit which is balanced on one side and unbalanced on the other or an input transformer designed to operate from an unbalanced line into push-pull vacuum tubes. Since the return lead 23 is connected to the mid-point of output impedance 26 only one-half the voltage across the output winding 27 is balanced against the voltage across variable resistance 9 or variable resistance 9 in parallel with variable condenser 11. Where the output winding 27 consists of two separate windings they are of course connected in series aiding. When the output impedance is connected as shown in this figure the numerator of equations 1 to 4 inclusive must be multiplied by two to obtain the amplification factor or transmission efficiency.

Fig. 4 shows the method of connecting a transformer 33 in Fig. 2 which is used in a circuit balanced on both sides. $R_{28}$ is equal to one-half the impedance from which the transformer is to work. The equations to be used in calculating the amplification factor or transmission efficiency are the same as those used when the transformer is connected as in Fig. 3.

Although this invention has been described in connection with a specific embodiment it is not to be understood as limited to this particular embodiment since numerous modifications thereof may be made by persons skilled in the art without departing from the spirit of applicant's invention, the scope of which is to be determined by the appended claims.

What is claimed is:

1. In a circuit for testing the characteristics of a transformer, an electrical network comprising a potentiometer circuit and a condenser, said potentiometer circuit having at least two arms, means for connecting said condenser in parallel with at least one of said arms, means for connecting said transformer to said network, means to produce a voltage across part of said network equal and opposite to the voltage produced across the secondary winding of said transformer and an indicating device for showing when said voltages are equal, said resistances having impedance values which are small compared to the impedance of the transformer under test.

2. In a circuit for measuring the phase shift of transformers, a potentiometer circuit for balancing the output voltage of said transformer against the voltage across one arm of said potentiometer and a condenser arranged to compensate for the phase difference between said input and output voltages, at least one arm of said potenoimeter having a resistance value which is small as compared to the impedance characteristics of the transformer under test.

3. A null reading system of measuring the phase shift of an electrical circuit which comprises means for connecting said circuit and a network of variable characteristic comprising elements calibrated in resistance and reactance to an alternating current source said network having an arm, the impedance of which is small compared to the impedance of the circuit under test and the voltage across which may be adjusted to balance the voltage across the output of said circuit, and means for connecting an indicator to said arm and said electrical circuit to indicate when said voltages are equal.

4. In a system for measuring the characteristics of an electrical circuit, an oscillator of variable frequency, a network comprising two variable resistances connected in series and across the output of said oscillator and a variable capacity, means for connecting said capacity in parallel with either of said resistances, means for connecting said circuit under test across one of said resistances, to induce a voltage across the output of said circuit equal and opposite to the voltage across the resistance which is not in parallel connection with said circuit, means for amplifying the voltage difference between said circuit under test and said resistance not in parallel connection with said circuit, and means for detecting the amount of said voltage difference.

5. In a circuit for measuring the characteristics of an electrical circuit, said characteristics including the phase shift, a potentiometer circuit having two arms, and a condenser arranged to be connected in parallel with either of said arms to compensate for the phase difference between the output voltage of said electrical circuit and the voltage across one of said arms.

6. In a system for measuring the phase shift of electrical apparatus, a device for producing a current of constant effective magnitude, said device comprising a source of alternating current, means for producing therefrom two currents, means comprising a network having elements calibrated to read directly in resistance and reactance for varying the phase of one of said currents, at least one of said elements which are calibrated to read directly in resistance having a resistance value which is small compared to the impedance of said electrical apparatus under test, a circuit for each such current, both circuits having a common branch, means for connecting said apparatus to be tested in one of said circuits in such a manner that the voltage across the outputs of said circuits will be in opposite directions, and means for detecting the difference in the voltages across the outputs of said circuits.

7. In a circuit arrangement for measuring the characteristics of an electrical circuit, said characteristics including the phase shift, three variable impedances, one of which is arranged to be connected in parallel with either of the other two to compensate for the phase difference between the output voltage of said electrical circuit and the voltage across one of said impedances, at least one of said other two impedances being small as compared to the impedance of the circuit under test.

8. In a circuit arrangement for measuring the phase shift of transformers, a circuit comprising two variable impedances for balancing the output voltage of said transformer against the voltage across one of said impedances, at least one of said impedances having a value which is small as compared to the impedance of the circuit in which said transformer is to be used, and a reactance arranged to compensate for the phase difference between said input and output voltages.

9. In a circuit for measuring the phase shift of transformers, a network comprising variable resistances for balancing the output voltage of said transformer against the voltage across one of said resistances and a reactance arranged to compensate for the phase difference between said input and output voltages, at least one of said resistances having a value considerably smaller than the impedance of said transformer.

10. The method of measuring phase shift in an electrical circuit which comprises applying a voltage to a phase-shifting network, applying a voltage of shifted phase derived from a portion of said network to the input of said electrical circuit and determining the phase shift in said circuit from the resistance and reactance values of said network required to produce a voltage across another portion of said network equal and opposite to the voltage across the output of said electrical circuit.

In witness whereof, I hereunto subscribe my name this 5th day of December A. D., 1927.

ARTHUR J. CHRISTOPHER.